Dec. 27, 1966        A. H. SEAY        3,294,066

FEEDER FOR NURSING ANIMALS

Filed Nov. 30, 1964        2 Sheets-Sheet 1

INVENTOR
ANDREW H. SEAY

BY
ATTORNEY

Dec. 27, 1966  A. H. SEAY  3,294,066
FEEDER FOR NURSING ANIMALS
Filed Nov. 30, 1964  2 Sheets-Sheet 2
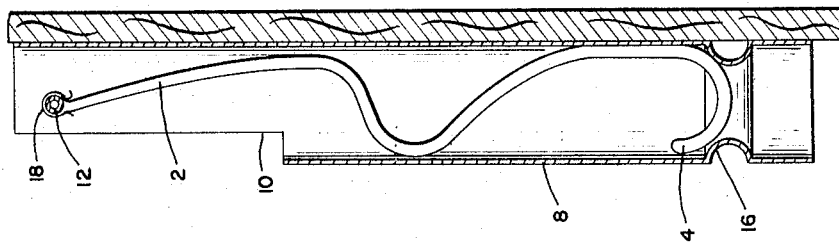
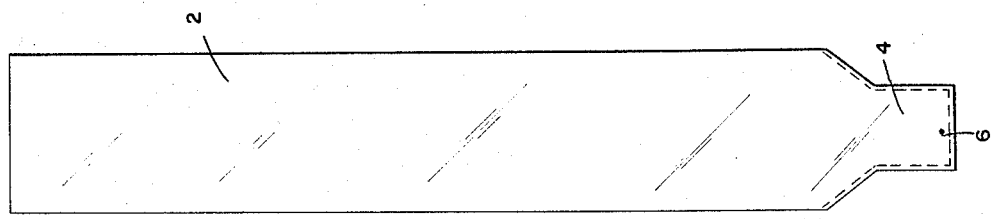
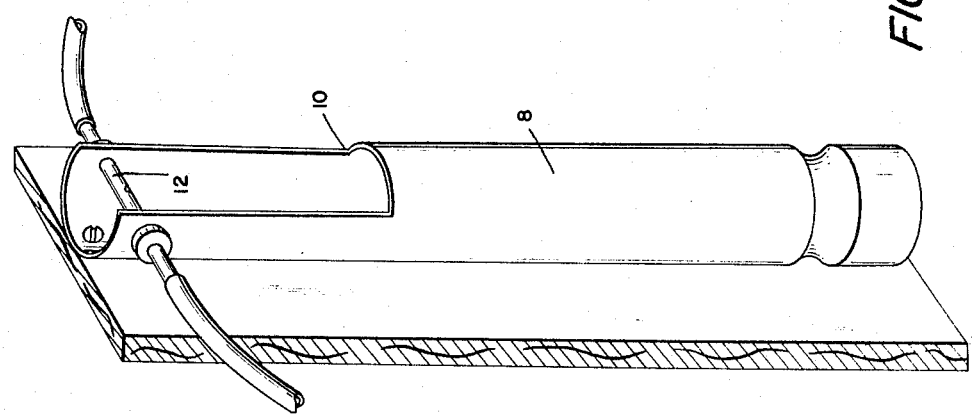
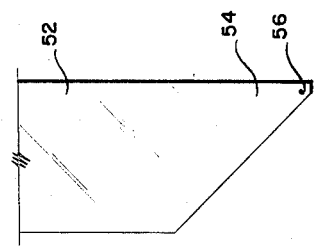
INVENTOR
ANDREW H. SEAY
BY
ATTORNEY

United States Patent Office 3,294,066
Patented Dec. 27, 1966

3,294,066
FEEDER FOR NURSING ANIMALS
Andrew H. Seay, Spotsylvania County, Va.
(R.F.D. 1, Box 104, Fredericksburg, Va. 22553)
Filed Nov. 30, 1964, Ser. No. 414,683
9 Claims. (Cl. 119—51.11)

This invention relates to an apparatus for feeding suckling animals, especially calves and other farm animals which may no longer nurse the mothers.

Animals in the nursing stage are frequently fed artificially instead of depending on the mother animal. Calves are often removed from their mothers and fed separately with milk or prepared food. The use of metal utensils and other equipment has many disadvantages and is a heavy burden to the dairy owner. Filling and distribution of pails to the calves is time consuming and frequently results in loss of milk by spilling or upsetting of the pails and sanitation requires that the pails and equipment be thoroughly washed under sterile conditions to prevent contamination. This practice also requires the presence of the attendant during every feeding period, which may be two or three times a day.

By the present invention, applicant uses inexpensive, disposable, sanitary containers which may be discarded after use, avoiding cleaning and sterilizing of utensils and reducing the amount of antibiotics which have to be administered to the calves. These containers may be used in feeding units which are connected to a source of liquid and are supplied with liquid from said source under control of time-controlled apparatus, so that feeding may take place at the proper time without the necessity for the presence of an attendant.

While the invention has been explained in detail as applied to cattle, it is equally applicable to other types of animals which suckle their young, and the form described is only for illustration of the more general invention.

One object of the invention is the provision of an automatic time-controlled system for feeding animals, in which a time-controlled liquid supply furnishes liquid for one or more feeding units at a given preset time.

Another object is to feed an animal from a container in the form of a disposable tubular bag, in which the bag contains dry, soluble food and liquid is added to the container at feeding time, the supplying of the liquid causing the feeding end portion of the bag to be displaced to a position where it is accessible to the animal.

Another object is to provide a package consisting of a tubular bag with a feeding end or nipple portion and containing dry, soluble food, the bag being filled with liquid for feeding, after which it may be thrown away.

Another object is to position a container so that its feeding end or nipple portion is inaccessible to or concealed from the animal, and to make the feeding end portion accessible to a feeding animal by the act of admitting liquid to the container.

Another object is to dissolve dry, soluble food into a liquid for feeding a suckling animal from a tubular bag having a feeding end or nipple portion by adding liquid to the dry soluble food in the bag and exposing the nipple portion to the suckling animal, the repeated compression of the nipple portion while sucking agitating the liquid to cause dissolving of the soluble food.

A further object of the invention is to supply a given amount of liquid at a given time by closing a circuit by a time clock to open a solenoid-operated valve, and to open the circuit by an interval timer to close the valve after a certain interval of time.

Other objects and advantages of this invention will be evident from the drawings and description of the apparatus and the functions it performs.

In the drawings:

FIGURE 3 is a view similar to FIGURE 2 of the support, with the container in place before filling with liquid.

FIGURE 4 is a view in elevation of the feeding container.

FIGURE 5 is a perspective view of the support, before insertion of the container.

FIGURE 7 is a view of a modified form of feeding container.

Figure 1:
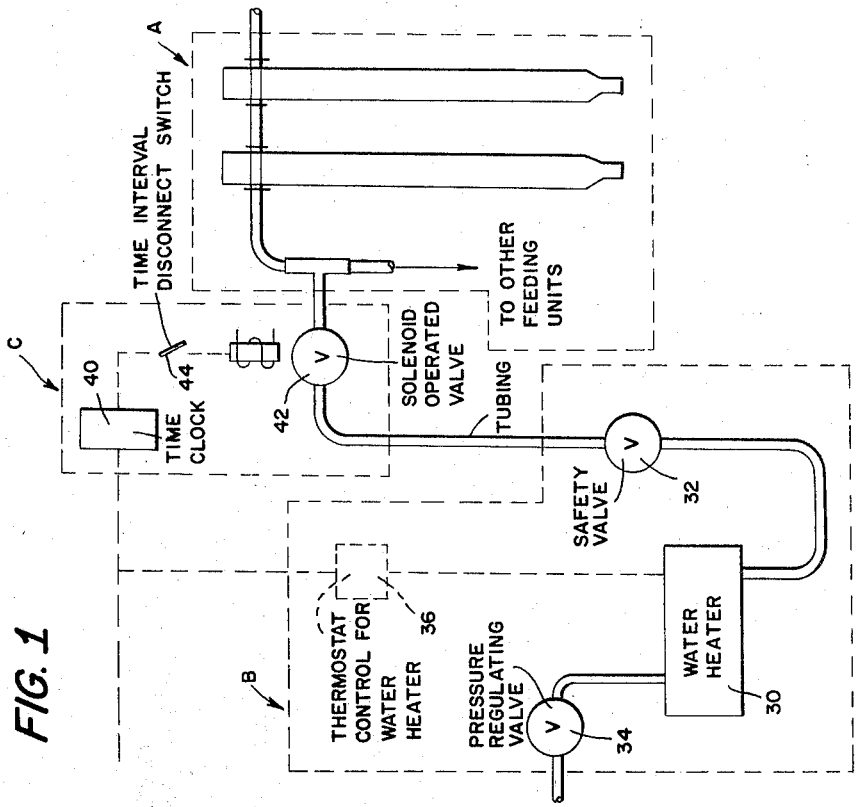
FIGURE 1 is a diagrammatic view of the entire system.

In the embodiment of the invention shown in the drawings, a plurality of feeding units A is connected to a source of warm water under pressure, shown at B, and controlled to supply the feeding units by the time-controlled mechanism shown at C.

The primary feeding element in each feeding unit A is a container shown in the form of an impervious, pliant tubular bag 2, as in FIGURE 4, which may be inexpensively made from a tube of supple plastic material, such as polyethylene. The lower extremity of the bag is reduced in size, as at 4, and is provided with a small opening 6 in the end, so as to form a feeding end or nipple portion.

Each unit includes a support 8, here shown as tubular in form and cut away in the front at top as at 10. A tube 12 passes through the upper end and is formed with a small opening 14 in its under side. Near its lower end, the support 8 has a depression in its wall to provide a restricted portion or retaining part 16 on the inner side.

The bag is placed in the support 8, the lower end or feeding end portion 4 resting on the retaining part 16. The upper end of the bag is wrapped around the tube 12 and held by clips 18, with the small opening 14 directed into the bag to admit liquid to the bag. When the feeding portion 4 rests on part 16, the front wall of the support conceals said portion, shielding it from an animal and preventing access to it for feeding.

Feeding from the feeding units is controlled by the supply of liquid to the feeding containers through openings 14 in tubes 12. The liquid, which in the system illustrated is water, is supplied from a source which includes a water heater 30, safety valve 32, and a pressure regulator valve 34 and thermostat control 36 to maintain correct pressure and temperature.

The time-controlled mechanism C controls the time of operation and the duration of the flow of liquid. A time clock 40 is set at the desired feeding time to close the switch to the solenoid-operated valve 42 to open the valve and admit water through openings 14 to containers 2. These openings 14 are made small to restrict the flow, which is continued until the time-interval switch 44 opens the circuit to the solenoid-operated valve to stop the flow of liquid. The size of openings 14 is selected to provide the proper amount of liquid in each container during the time interval of flow, so that the time-interval switch 44 and openings 14 provide the correct volume of liquid in each container.

Figure 2:
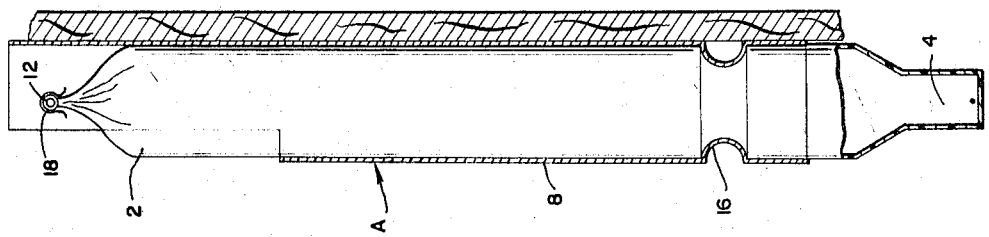
FIGURE 2 is a sectional view of the support for the feeding container with the container filled and in position for an animal to nurse on the lower feeding end portion.
Figure 6:
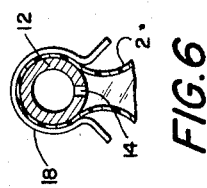
FIGURE 6 is an enlarged fragmentary cross-sectional view of the support for the upper end of the bag.

The present apparatus is particularly designed to use dry, soluble powdered food material which is commonly available for nursing animals, and the proper amount of such material is placed in each bag. When water is admitted to the feeding units, the weight of the liquid causes the feeding end or nipple portion 4 of each bag to move down below the support 8 into feeding position, as shown in FIGURE 2, where it is accessible to a calf.

Prior mixing of the dry food material and water has been found to be unnecessary with the present feeding containers. When the calf nurses on the feeding portion 4, it compresses this portion, forcing the water upward into the body of the bag. Repeated compression of this feeding portion in this manner moves the column of water up and down in the bag, which is confined by tubular portion 8, and agitates the liquid and causes the soluble food material to dissolve rapidly, thereby avoiding the usual practice of mixing of dry material and liquid before feeding.

The container 2 as shown in FIGURE 4 is inexpensively made from tubular material such as polyethylene, with the lower end sealed in the form of a reduced portion 4 having a small opening 6 to form a nipple portion. This container may be discarded after each feeding, saving time of an attendant and also the labor of washing and sterilizing utensils and equipment.

Each bag may be initially provided with the dry food material in it by the supplier, so that the bag is in the form of a package for the material. This package is then unfolded or unrolled, and the bag placed in the support as shown. The addition of water may be manually controlled at the time clock or may be initiated at the proper time by the clock, completing the preparation for the unit for feeding in the state illustrated in FIGURE 2.

A modified form of container 52 is shown in FIGURE 7, the reduced end portion 54 being formed by cutting and sealing the bottom of the bag at an angle of 45°, with the extreme lower end formed square and an opening 56 therein to form the nipple portion.

In operation, the containers 2 with dry, soluble food material therein, are placed in the supports 8 and secured to tubes 12 with clips 18. The lower feeding end portions 4 rest within the supports and are inaccessible to the animals, as shown in FIGURE 3. The time clock may be set for the proper feeding time, and at that time it will close the circuit to open the solenoid-operated valve 42. Warm water under pressure will flow to the tubes 12 and through openings into the containers 2 until the valve 42 is closed upon opening of the circuit by the time interval switch 44.

The weight of the water in each container 2 will cause the feeding end portion 4 to move down below the support 8, as shown in FIGURE 2, into feeding position for nursing by a calf. The repeated compression of the nipple portion 4 by the calf will cause the water to move up and down in the container, thereby quickly dissolving the dry food material and forming liquid nutriment.

At any time after the feeding is completed, each container 2 may be removed by disconnecting the upper end and withdrawing the container from the lower end of the support. In this manner, no contamination of the support from the nipple portion is possible, and the new container may be safely inserted in the support.

It will be obvious that different procedures may be carried out according to the desire of the operator. For example, the dairy attendant may operate the apparatus for one feeding in the morning and then set the apparatus for the next feeding at a later time. It is also possible to use the containers for two or three feedings if the feedings are close enough together that there is no danger of unsanitary conditions. In any case, each bag with its dry food material must be positioned with its feeding nipple portion in the support, to prevent sucking or chewing by the calf when no liquid is present.

It will be understood that I do not intend the structures and methods to be limited to the precise form disclosed herein, but that various modifications may be made within the scope of the invention as defined in the appended claims.

I claim:

1. In an apparatus for feeding suckling animals, a plurality of feeding units, each unit having a removable container with a downwardly projecting feeding nipple portion and dry, soluble feed therein and a liquid supply with an outlet opening into the container means shielding said downwardly projecting feeding nipple portion from access to a feeding animal when no liquid is present in said container, a source of water connected to the liquid suply for each unit, and control means to establish a flow of water from said source to said outlets in a quantity to provide water to dissolve said soluble feed in each container, operation of said control means to establish said flow rendering each of said nipple portions accessible to a feeding animal.

2. In an apparatus for feeding suckling animals, a plurality of feeding units, each unit comprising a separately formed, disposable container having a feeding nipple portion adjacent its lower extremity, and shielding means preventing access to said feeding portion by a feeding animal when no liquid is present in said container, and each unit having a liquid supply with an outlet opening into said container, a liquid supply source connected to the liquid supply for each unit, and control means to establish a flow of liquid from said source to said outlets, operation of said control means supplying liquid to said containers causing displacement of said feeding portion relative to the shielding means of each unit to render said shielding means ineffective to prevent access to a feeding animal and allow an animal to feed from said feeding portion of each container.

3. In an apparatus for feeding suckling animals, a plurality of feeding units, each unit comprising a container having a feeding nipple portion adjacent its lower extremity, and shielding means preventing access to said feeding portion by a feeding animal when no liquid is present in said container, and each unit having a liquid supply with an outlet opening into said container, a liquid supply source connected to the liquid supply for each unit, and control means to establish a flow of liquid from said source to said outlets, operation of said control means supplying liquid to said containers causing relative displacement of said shielding means and feeding portion of each unit to expose said feeding portion to a feeding animal and allow an animal to feed from said feeding portion of each container.

4. In an apparatus for feeding suckling animals, a liquid supply source, a plurality of feeding units, each unit comprising a disposable container in the form of a tubular bag having a feeding nipple portion on its lower extremity, and a support means for said container having means for detachably fastening said container adjacent its upper extremity and for supporting said feeding nipple portion in an inaccessible location above feeding position, said liquid supply means being connected to a liquid supply for each unit having an outlet opening into each container at each support means to supply liquid to said containers, and time-controlled means operable to supply a quantity of liquid to said containers at a time set by said time-controlled means, the weight of said liquid in each container moving said nipple portion down to feeding position.

5. In a feeder for suckling animals, said feeder comprising a container of flexible material having a feeding nipple portion at its lower extremity, a liquid supply with an outlet for liquid opening into said container, and support means for said container, and means securing said container adjacent its upper extremity to said support means, said support means including means supporting said feeding nipple portion above the feeding position and inaccessible from outside said support means, the weight of the liquid when admitted to said container moving said feeding nipple portion down to feeding position.

6. A supporting means for a container, an elongated flexible container having a feeding portion on its lower extremity and adapted to contain liquid for animal feeding, said supporting means having means to fasten the upper extremity of said container and a retaining part below said means which will support said feeding portion when no liquid is in said container, and a shielding portion extending about said retaining part to prevent access to said feeding portion, said retaining part being insufficient to sustain said feeding portion with the weight of liquid added to said container, so that said feeding portion moves down to an accessible position when liquid is admitted to said container.

7. A feeder for suckling animals comprising the combination of an elongated, pliant, foldable, tubular bag of thin, supple material containing a mixture of dry feed and liquid, and stationary vertical supporting means of substantially the same length as said bag for supporting and maintaining said bag in tubular shape when filled with said feed and liquid for suckling by a nursing animal, said bag having an opening provided in an upper end thereof to receive said liquid and converging at the lower end when filled with liquid from its maximum width to a narrow extremity of substantially less width having an aperture therein so that said lower end forms a narrowed feeding nipple portion, said supporting means detachably suspending said bag at its upper end, said supporting means having a tubular portion receiving said bag therein, said tubular portion being no larger in diameter than said tubular shape of said bag and encircling and confining said bag above said narrowed feeding nipple portion with said narrowed feeding nipple portion below said tubular portion of said support, said tubular portion of said support maintaining said bag, when distended by liquid, stationary and in tubular shape, so that the liquid in said bag forms a column which moves up and down within said bag as the narrowed feeding portion below said tubular portion is intermittently compressed by a nursing animal to agitate said mixture of feed and liquid.

8. A feeder as claimed in claim 7, in which said tubular bag is on the order of several times longer than its width, and said narrowed end portion is closed along an inclined line extending from one side to said narrow extremity connecting to the opposite side.

9. The device as defined in claim 7, in which said support includes a tube receiving the upper end of the bag and having an opening directed into the upper end of the bag to supply liquid to said bag.

References Cited by the Examiner

UNITED STATES PATENTS

| 2,239,347 | 12/1943 | Graham | 119—71 |
| 2,628,906 | 2/1953 | Horan. | |
| 2,661,800 | 12/1953 | Reichenbach | 119—18 |
| 2,697,531 | 12/1954 | Hood | 215—11 |
| 3,037,481 | 6/1962 | Kloss | 119—71 |
| 3,192,902 | 6/1965 | Gammill | 119—51.11 |
| 3,216,397 | 11/1965 | Pickard | 119—71 |

SAMUEL KOREN, *Primary Examiner.*

HUGH R. CHAMBLEE, *Examiner.*